United States Patent
Zeiler et al.

(10) Patent No.: US 10,750,245 B1
(45) Date of Patent: Aug. 18, 2020

(54) USER INTERFACE FOR LABELING, BROWSING, AND SEARCHING SEMANTIC LABELS WITHIN VIDEO

(71) Applicant: CLARIFAI, INC., New York, NY (US)

(72) Inventors: Matthew D. Zeiler, New York, NY (US); Adam L. Berenzweig, New York, NY (US); Christopher Yan, New York, NY (US)

(73) Assignee: Clarifai, Inc., New York, NY (US)

( * ) Notice: Subject to any disclaimer, the term of this patent is extended or adjusted under 35 U.S.C. 154(b) by 0 days.

(21) Appl. No.: 16/662,790

(22) Filed: Oct. 24, 2019

Related U.S. Application Data

(63) Continuation of application No. 14/952,530, filed on Nov. 25, 2015, now abandoned.

(60) Provisional application No. 62/084,506, filed on Nov. 25, 2014.

(51) Int. Cl.
*H04N 21/482* (2011.01)
*H04N 21/472* (2011.01)
*G06F 16/73* (2019.01)

(52) U.S. Cl.
CPC ......... *H04N 21/4828* (2013.01); *G06F 16/73* (2019.01); *H04N 21/47205* (2013.01); *H04N 21/47217* (2013.01)

(58) Field of Classification Search
None
See application file for complete search history.

(56) References Cited

U.S. PATENT DOCUMENTS

| | | | | |
|---|---|---|---|---|
| 8,589,402 | B1 * | 11/2013 | Iampietro | G06F 16/5866 707/741 |
| 2007/0239447 | A1 * | 10/2007 | Yamasaki | H04H 60/37 704/235 |
| 2008/0031590 | A1 | 2/2008 | Kulas | |
| 2008/0184121 | A1 | 7/2008 | Kulas | |
| 2010/0071005 | A1 | 3/2010 | Kusunoki | |
| 2010/0111360 | A1 * | 5/2010 | Sigal | G06Q 30/02 382/103 |

(Continued)

OTHER PUBLICATIONS

Non-Final Office Action dated Aug. 25, 2016 in related U.S. Appl. No. 14/952,530, 13 pages.

(Continued)

*Primary Examiner* — James R Marandi
(74) *Attorney, Agent, or Firm* — Pillsbury Winthrop Shaw Pittman LLP

(57) ABSTRACT

Systems and methods for browsing, searching, and/or viewing video with associated semantic labels via a user interface are presented herein. Presentation of a user interface may be effectuated. The user interface may be configured to display scenes of one or more videos and/or one or more semantic labels associated with the scenes. A first scene associated with a first video and a first semantic label associated with the first scene may be displayed in the user interface. Playback of the first video in the user interface may cause one or more changes in the display of semantic labels over time, such that responsive to playback of the first video including display of a second scene after the first scene, a second semantic label is displayed and the first semantic label is no longer displayed. The second semantic label may be associated with the second scene.

18 Claims, 4 Drawing Sheets

(56) References Cited

U.S. PATENT DOCUMENTS

2013/0282747 A1    10/2013  Cheng
2013/0314441 A1*   11/2013  Grasset ..................... G06T 1/00
                                                          345/633
2014/0064706 A1*    3/2014  Lewis, II ................ H04N 5/93
                                                          386/278
2018/0197052 A1*    7/2018  Yanson .............. G06K 19/0614

OTHER PUBLICATIONS

Final Office Action dated Mar. 10, 2017 in related U.S. Appl. No. 14/952,530, 14 pages.
Advisory Action dated Apr. 20, 2017 in related U.S. Appl. No. 14/952,530, 5 pages.
Examiner's Answer to Appeal Bried dated Nov. 2, 2017 in related U.S. Appl. No. 14/952,530, 21 pages.
Patent Trial and Appeal Board Decision dated Aug. 27, 2019 in related U.S. Appl. No. 14/952,530, 10 pages.
Li et al., "Confidence-based Dynamic Ensemble for Image Annotation and Semantics Discovery", ACM, Nov. 2003, pp. 12.

* cited by examiner

USER INTERFACE FOR LABELING, BROWSING, AND SEARCHING SEMANTIC LABELS WITHIN VIDEO

CROSS REFERENCE TO RELATED APPLICATIONS

This application is continuation of U.S. patent application Ser. No. 14/952,530, filed Nov. 25, 2015 and entitled "USER INTERFACE FOR LABELING, BROWSING, AND SEARCHING SEMANTIC LABELS WITHIN VIDEO," which claims the benefit of priority to U.S. Provisional Patent Application No. 62/084,506 filed Nov. 25, 2014 and entitled "USER INTERFACE FOR LABELING, BROWSING, AND SEARCHING SEMANTIC LABELS WITHIN VIDEO," each hereby expressly incorporated herein by reference in its entirety.

FIELD OF THE DISCLOSURE

The present invention relates generally to user interfaces used for video production, editing, review, and/or management.

BACKGROUND

In many domains, the only metadata available for organizing and searching large video repositories are file-level metadata such as title, caption, creation time, and in some cases, geographic tags. This may limit the way in which a user may search for videos and/or video data within the repository.

SUMMARY

One or more aspects of the disclosure relate to a system for browsing, searching, and/or viewing video with associated semantic labels via a user interface. In some implementations, object recognition within video may enable the processing of large repositories of video, producing fine-grained semantic labels at high (sub-second) time resolution. A user interface may be presented to a user that facilitates user interaction with video content based on associated semantic labels. In some implementations, the user interface may facilitate interaction within a single video and/or one or more videos. In some implementations, the one or more aspects of the system may facilitate collection of training data for a machine learning component used to discover, determine, and/or predict the labels from video and/or images.

The system may comprise one or more physical processors configured to execute one or more computer program components. The computer program components may include a video processing component, a labeling component, a user interface (UI) component, a learning component, and/or other components.

The video processing component may be configured to obtain one or more videos and/or information associated with the videos. The videos and/or information associated with the videos may be obtained from a video repository, and/or other considerations. The video processing component may be configured to determine scenes of the one or more videos and/or content of the videos. Content may be associated with the subjects and/or objects portrayed in the video including actors (e.g., a person or group of people, an animal, and/or other considerations), points of interest (e.g., a building, a landscape, a vehicle, and/or other considerations), a background (e.g., a location, an environment, and/or other considerations), a timing aspect (e.g., day versus night), and/or other considerations. Content may be identified and/or described based on object recognition, user input, and/or other technique(s).

Scenes may be distinguishable by time-varying signals associated with a video. Time varying signals may include changes in the content portrayed in the video over time (e.g., change in a sequence of similar content being portrayed) such as a change in a background (e.g., location, environment, and/or other considerations), change in subjects portrayed in the video (e.g., different persons or object), changes in a timing aspect (e.g., scene change from day to night, and/or other considerations), user input, and/or other considerations.

In some implementations, the labeling component may be configured to associate one or more semantic labels with content in the video (e.g., determined by the video processing component), scenes, and/or other considerations. In some implementations, the semantic labels may be provided as part of metadata included in the information associated with the videos. By way of non-limiting example, responsive to determination of content based on object recognition and/or other technique in which content may be identified and/or described, the labeling component may be configured to automatically associate an appropriate semantic description (e.g., a semantic label) with the content.

In some implementations, the user interface component may be configured to effectuate presentation of a user interface. The user interface may be configured to display scenes of one or more videos facilitating playback of the videos (e.g., continuous playback, frame by frame playback, and/or other considerations). The user interface component may be configured to display in one or more portions of the user interface one or more semantic labels associated with the scenes and/or content portrayed in the scenes being played back.

The user interface may facilitate user interaction with the video and/or semantic labels. The user interface may facilitate user navigation through time within the video including jumping to a point within the video, selecting and/or jumping to a scene, changing a zoom level of a particular scene and/or frame, and/or other considerations. The user interface may update the display of semantic labels dynamically as the video is playing and/or in response to user actions such as searching, selecting labels of interest, and/or other considerations.

In some implementations, the user interface component may be configured to receive and/or execute queries related to the one or more semantic labels. The queries may correspond to requests for content, scenes, points in time, and/or other aspects of a video that correspond to one or more semantic labels or other information identified in the queries. The queries may correspond to entry and/or selection of information associated with the one or more semantic labels by a user via the user interface (e.g., via a text input field, and/or other considerations).

In some implementations, the learning component may be configured to collect training data and/or receive feedback from human labelers about the performance of the labeling component. In some implementations, feedback may include corrections of association errors (e.g., errors in object recognition, label selection, and/or label association), addition of relevant labels associations that were missing, and/or boosting/confirming associations made by the labeling component. In some implementations, each label displayed on the user interface may be associated with additional interface elements and/or interaction modes for receiving entry and/or selection of user feedback (e.g., deletion and/or confirmation). In some implementations, the interface also may allow the user to select whether their feedback applies to a particular scene being displayed, the video as a whole, and/or other considerations. In some implementations, the learning component may be configured to collect training data and/or receive feedback associated with performance of other components.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular forms of "a", "an", and "the" include plural referents unless the context clearly dictates otherwise.

DETAILED DESCRIPTION

Figure 1:
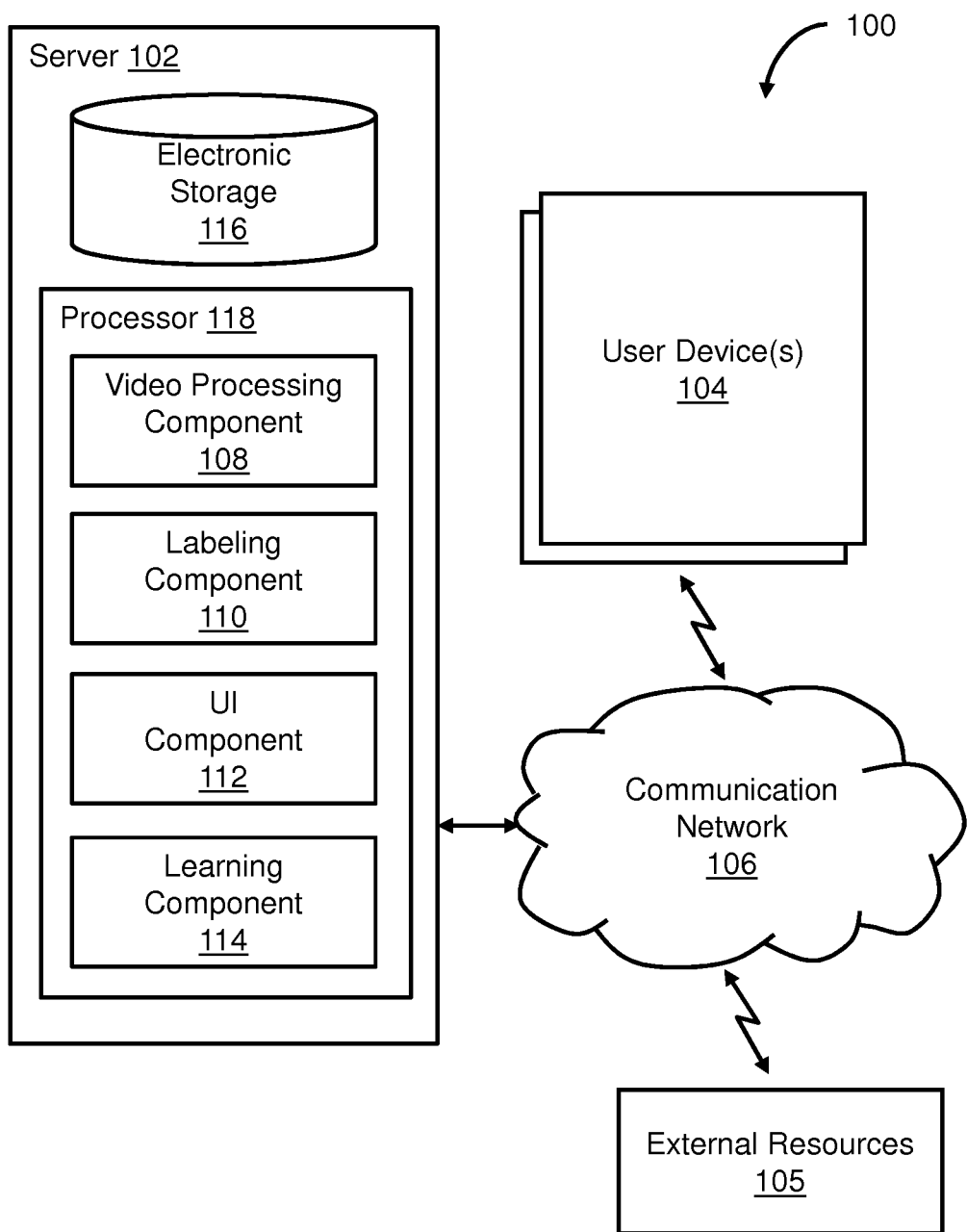
FIG. 1 illustrates a system for browsing, searching, and/or viewing video with associated semantic labels via a user interface, in accordance with one or more implementations.

FIG. 1 illustrates a system 100 for browsing, searching, and/or viewing video with associated semantic labels via a user interface. The user interface may be hosted to user devices 104 associated with users of the system over a network 106, such as the Internet. The user interface may be hosted by a server 102. The server 102 may comprise one or more physical processors 118 configured to execute one or more computer program components. The computer program components may include a video processing component 108, a labeling component 110, a user interface (UI) component 112, a learning component 114, and/or other components. Users may access the system 100 and/or user interface (not shown in FIG. 1) via user devices 104.

User devices 104 may include, for example, a cellular telephone, a smartphone, a laptop, a tablet computer, a desktop computer, a television set-top box, smart TV, a gaming console, and/or other device as described herein and/or other considerations. It is noted that in other implementations, some or all of the functionally of server 102 may be attributed to one or more user devices 104. In such implementations, the user devices 104 may include one or more physical processors configured to execute computer program components the same or similar to components 108-114. For example, the user devices 104 may be configured to host the user interface (not shown in FIG. 1) based on information stored locally on the user devices 104.

The video processing component 108 may be configured to obtain one or more videos and/or information associated with the videos. The videos and/or information associated with the videos may be obtained from a video repository, and/or other considerations. For example, a video repository may comprise data stored by and/or accessible to electronic storage 116, external resources 105, and/or other considerations.

The video processing component 108 may be configured to determine information about one or more videos. The information may include scenes of the one or more videos and/or content of the videos. Content may be associated with the subjects and/or objects portrayed in the video including actors (e.g., a person or group of people, an animal, and/or other considerations), points of interest (e.g., a building, a landscape, a vehicle, and/or other considerations), a background (e.g., a location, an environment, and/or other considerations), a timing aspect (e.g., day versus night), and/or other considerations. Content may be identified and/or described based on object recognition, user input, and/or other technique(s).

In some implementations, objects and/or other content detected in a scene may be identifiable by a user (e.g., in a user interface) via a bounding box displayed around a detected object or other content. In some implementations, the bounding box may be used to provide additional information throughout time such as where object may be present within frames and how the object may move between frames, throughout a presented scene, and/or throughout the video as a whole.

Scenes may be distinguishable by time-varying signals of a video, and/or other considerations. Time varying signals may be identified by changes in the content portrayed in the video over time (e.g., change in a sequence of similar content being portrayed) such as a change in a background (e.g., location, environment, and/or other considerations), change in subjects portrayed in the video (e.g., different persons or object), changes in a timing aspect, changes in semantic labels between frames, user input, and/or other considerations.

In some implementations, the time-varying signals associated with a video may be used to compute scene boundaries (e.g., start and/or end times) to split a video into cohesive scenes, and/or other considerations. Signals that may be used for this purpose may include one or more of a time series of semantic labels predicted by the labeling component, a representation in a semantic space used for determining similarity (or differences) between different frames of the video, and/or other considerations. The semantic space may also be used to cluster scenes into groups of scenes related by similar content based on the associated semantic labels. In some implementations this relation may be hierarchical.

In some implementations, one or more scenes of a video may be temporally "clustered" based on sequentially displayed content that has the same or similar semantic label information, and/or other information. In some implementations, one or more scenes of a video may be temporally "clustered" based on visually similar content within sequential portions (e.g., frames) of the video. Clustering directly on visual similarity may provide a technique for clustering similar portions of the video without relying on the semantic information. In some implementations, combinations of both types of information can be utilized (e.g., visual information and/or semantic label information), with variable weighting between the two (e.g., more semantically related scene content versus more visually similar content within scenes) in order to determine the scenes of a video, and/or other considerations.

By way of non-limiting illustration, the video processing component 108 may be configured to obtain a first video. The video processing component may be configured to determine first information associated with the first video. The first information may include one or more of a first scene in the first video (e.g., a first scene start time and a first scene end time), a second scene of the first video, a third scene, a first object associated with the first video, a first background associated with the first video, a first semantic label associated with the first scene, a second semantic label associated with the second scene, a third semantic label associated with the third scene, and/or other information.

The labeling component 110 may be configured to obtain one or more semantic labels associated with the videos. In some implementations, the semantic labels may be provided as part of metadata included in the information associated with the videos. For example, the semantic labels may have been defined during production and/or post-production processing of the video, and/or other considerations. The semantic labels may be associated with content, scenes, scene portions, and/or aspects of the video.

In some implementations, the labeling component 110 may be configured to associate one or more semantic labels with content in the video (e.g., determined by the video processing component), scenes, and/or other considerations. For example, responsive to determination of content based on object recognition, user input, and/or other technique in which content may be identified and/or described, the labeling component may be configured to automatically associate a semantic description (e.g., a semantic label) with the content. In some implementations, associations of semantic labels may be user-defined (e.g., via user interface component 112, presented below).

In some implementations, semantic labels may be associated with specific points in time and/or to time intervals. By way of non-limiting example, labels may be associated to content and/or scenes at regular intervals, applied dynamically based on scene changes, and/or other considerations. In some implementations, labels may be chosen from a fixed vocabulary of potentially very large size (tens or hundreds of thousands of labels, and/or other considerations), or free text. Labels may be organized into a semantic hierarchy, for example reflecting relationships such as synonyms, antonyms, is-a (hypo- and hypernyms) and part-of (mero- and holonyms), and/or other considerations.

By of non-limiting illustration, the labeling component 110 may be configured to associate a second semantic label with the first video. The labeling component 110 may be configured to associate the second semantic label with the second scene of the first video. The labeling component 110 may be configured to associate other semantic labels with other content of the first video.

In some implementations, the user interface component 112 may be configured to effectuate presentation of a user interface (not shown in FIG. 1). The user interface component may be configured to display scenes of one or more videos facilitating playback of the videos within the user interface. The user interface component may be configured with one or more portions configured to display one or more semantic labels associated with the scenes and/or content portrayed in the scenes being played back. The user interface may facilitate user interaction with the video and/or semantic labels. The user interface may facilitate user navigation through time within the video including jumping to any point within the video, selecting and jumping to scenes, changing a zoom level of a particular scene and/or frame, and/or other considerations. The user interface may update the display of semantic labels dynamically as the video is playing and/or in response to user actions such as searching and/or selecting labels of interest.

In some implementations, the user interface component 112 may be configured to receive and/or execute queries related to the one or more semantic labels. The queries may correspond to requests for content, scenes, points in time, and/or other aspects of a video that correspond to one or more semantic labels and/or other information identified in the queries. The queries may correspond to entry and/or selection of information associated with the one or more semantic labels by a user via the user interface (e.g., via a text input field of the user interface, and/or other considerations).

Figure 2:
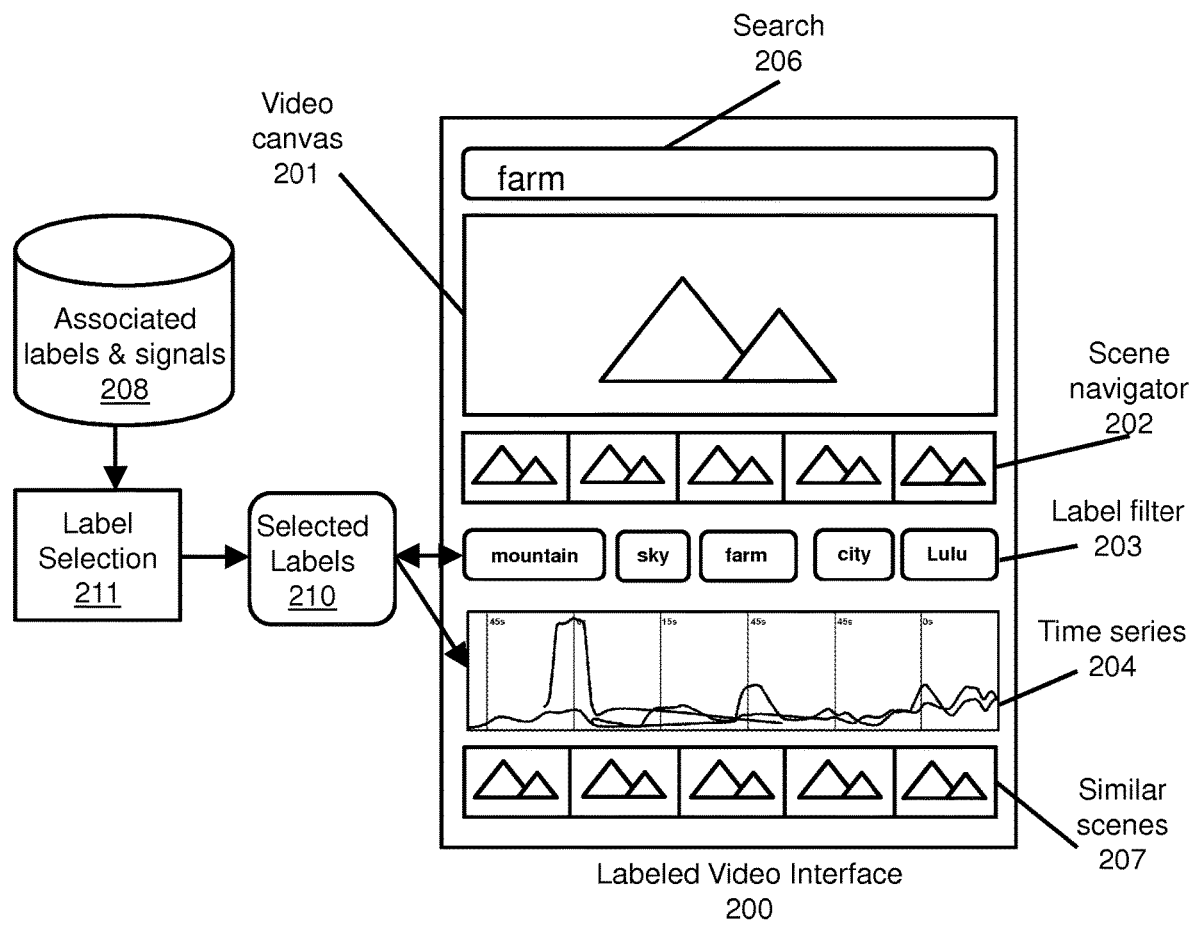
FIG. 2 illustrates a diagram of information flow between procedures of the system for facilitating user interaction with a user interface, in accordance with one or more implementations.

By way of illustration in FIG. 2, an implementation of a user interface 200 is depicted. The user interface 200 may include one or more user interface elements and/or portions. The user interface elements and/or portions may comprise one or more of: a video canvas 201 for rendering video content for playback; a navigation portion 202 for navigating through time within the current video; a label filter portion 203 conveying of a subset of labels relevant to the current video, scene, and/or view zoom levels shown in the video canvas 201; a time series portion 204 depicting the time series of label association confidence for a subset of labels (e.g., shown in the label filter portion 203) over the duration of the video, scene, and/or view zoom level; a label selection portion 300 (FIG. 3) for changing a current selection of labels 210 (and displayed in the labels filter portion 203); a search portion 206 for receiving user entry and/or selection of information related to a query for searching for semantic labels within the video; a similar scene display portion 207 showing a set of videos or scenes ranked by similarity to the current video, scene, or view zoom level (e.g., based on similar content, semantic labels, and/or other considerations); and/or other elements and/or portions.

In some implementations, the navigation portion 202 may be configured to facilitate one or more of jumping to a point within the video, selecting and/or jumping to scenes (e.g., when scene boundaries may be available), changing the zoom level of the label filter portion 203 and/or time series 204, and/or may facilitate other user operations.

Figure 3:
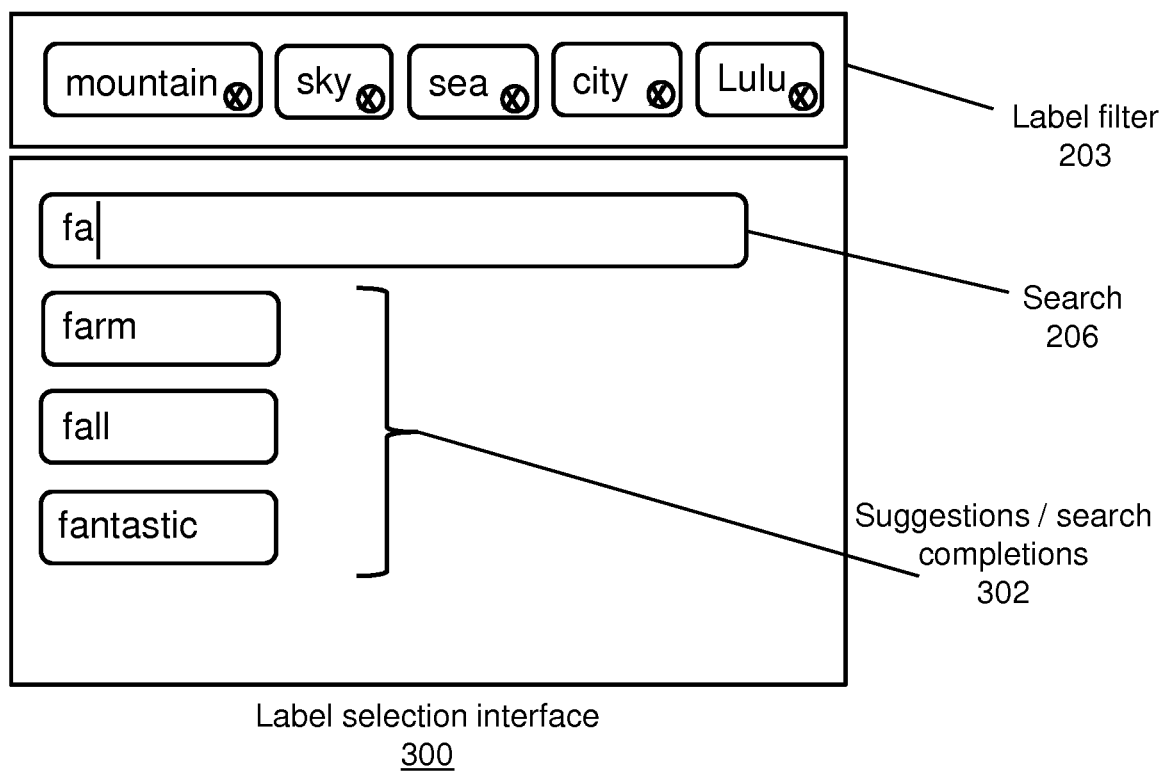
FIG. 3 illustrates a label selection interface, in accordance with one or more implementations.

The portions 203 and 204 reflect a set of selected labels 210 (e.g., selected via the labeling component). The selected labels 210 may be determined by a selection algorithm 211 (e.g., included with or accessible by the labeling component). The selected labels 210 may be determined manually via the label selection interface 300 (FIG. 3). An implementation of the label selection interface is shown in FIG. 3.

In some implementations, the selection algorithm 211 may be configured to perform a dynamic selection of a subset of all available labels 208, and/or other considerations. In some implementations, a selection may be based on a currently selected scene or view zoom level, and/or label association confidences and/or activation strengths. By way of non-limiting example, a selection of labels most confidently matching the content portrayed in a scene and frame may be an aggregated confidence within the current view selection. In some implementations, confidence may be determined based on a scoring and/or ranking technique corresponding to identified content (e.g., via object recognition and/or other technique) and a potential label that it may be associated with. In another non-limiting example, the selection algorithm 211 may dynamically update the label section as the video plays, for example by showing the top labels relevant for the currently playing scene, frame, and/or other considerations.

The time series portion 204 may include a graphical rendering of the confidence score or activation strength of the predicted labels over the current set of selected labels 210. In some implementations, the time series portion 204 may support interactions such as entry and/or selection of the graph to jump to a point in time within the video and begin playing, entry and/or selection of a label to highlight its trendline within the time series graph when there are multiple labels, and/or other considerations. In some implementations, the level of association confidence may be represented by the height of the lines in the graph, and/or other considerations. In some implementations, this confidence may be represented in other plotting methods including but not limited to scatter plots, bar charts, spectrographs, and/or other considerations where the graphs may be aggregated or separated by label.

In some implementations, the label filter portion 203 may also encompass a label selection interface 300 (FIG. 3) that shows other predicted labels, and/or provides the user with a way to select/unselect (other or additional) labels. In some implementation, the selection interface may include a search element with search completion (FIG. 3), interface elements on each label to dismiss/delete them, interaction designs such as enter and/or selection to select/deselect, "drag and drop" labels from the suggestions to the selected set, and/or other considerations. The selection interface 300 may be hidden or folded up into user interface 200, and/or subsequently expanded or revealed upon user action.

In some implementations, labels may be organized into a semantic hierarchy, and/or other considerations. The selection interface 300 (FIG. 3) may be configured to make use of the hierarchy, for example by grouping label suggestions according to the hierarchy, and/or other considerations. By way of non-limiting example, the selection of an ancestor node in the hierarchy such as dog can be treated as implicit selection of the descendant nodes such a Labrador retriever or terrier.

In some implementations, the search portion 206 may be configured to receive user entry and/or selection of information for searching for semantic labels associated with a video. The user interface component 112 may be configured to receive and/or execute queries related to the one or more semantic labels. The queries may correspond to requests for content, scenes, points in time, and/or other aspects of a video that correspond to one or more semantic labels or other information identified in the queries. The queries may correspond to the user entry and/or selection of information into the search portion 206. The user entry and/or selection may be associated with the one or more semantic labels and/or other information the user wishes to search for within a current video, scene, zoom level, frame, and/or other considerations. In some implementations, the search portion 206 may comprise a text input field, and/or other considerations. The user interface component 112 may be configured effectuate a change in the scenes and/or semantic labels displayed in the user interface based on results obtained from the queries. The change in the scenes and/or semantic labels may correspond to the results obtained from the queries (e.g., the scene and/or semantic label may cause the video to "jump" to a different scene and/or frame associated with the searched label).

By way of non-limiting illustration, the user interface component 112 may be configured to effectuate presentation of a user interface. The user interface component 112 may be configured to display, in the user interface, the first scene associated with the first video, the first semantic label associated with the first scene, and/or other elements and/or portion.

In some implementations, responsive to playback of the first video including display of the second scene temporally after the first scene, the user interface component 108 may be configured to display the second semantic label and no longer display the first semantic label, and/or other considerations.

In some implementations, the user interface component 112 may be configured to receive a first query. The first query may be related to the second semantic label. The user interface component 112 may be configured to effectuate a change in the scenes and/or semantic labels displayed in the user interface based on results obtained from the first query. Responsive to obtaining first results from the first query (e.g., determining portions of the video that correspond to the second semantic label), the user interface component 112 may be configured to change the display of the first scene in the user interface to a display of the second scene in the user interface, and/or other considerations.

In some implementations, the learning component 114 may be configured to collect training data and/or receive feedback from human labelers about the performance of the labeling component. In some implementations, feedback may include corrections of association errors (e.g., errors in object recognition, label selection, and/or label association), addition of relevant labels associations that were missing, and/or boosting/confirming suggested associations made by the labeling component (see, e.g., selection/search completion portion 302 of label selection interface 300). In some implementations, the selection/search completion portion 302 may be configured to effectuate display of predicted/ suggested labels based on full and/or partial entry and/or selection of information related to one or more semantic labels (e.g., entered and/or selected via search portion 206, and/or other considerations).

In some implementations, each label displayed on the user interface 200 (FIG. 2) and/or label selection interface 300 (FIG. 2) may be associated with additional interface elements and/or interaction modes for receiving entry and/or selection of user feedback (e.g., deletion and/or confirmation). In some implementations, an interface also may allow the user to select whether their feedback applies to a particular scene being displayed, the video as a whole, and/or other considerations. In some implementations, the learning component 114 may be configured to collect training data and/or receive feedback associated with performance of other components.

In FIG. 2, in some implementations, the time series portion 204 may be configured to provide additional functionality or controls that may allow user feedback on the continuous predictions over time. This feedback may include deleting entire lines, adjusting the height/confidence of each lines, sliding the lines to improve alignment with the video playback, and/or other considerations.

In some implementations, scene boundaries (e.g., end and/or start times) may be adjusted via user interface elements (not shown) included in the navigator portion 202 and/or other portion of the user interface 200.

In some implementations, if bounding boxes are available, they may be rendered in an overlay in the video canvas portion 201 for the object labels currently in the label filter portion 203.

In some implementations, with the presentation of similar scenes and videos for the video presented in portion 207, a feedback mechanism may be integrated to capture how users interact with that content. In some implementations, user entry and/or selection of a scene and/or video displayed in portion 207 may be treated as positive feedback for the user-selected scene. This selection may confirm the association of the selected scene with the currently displayed scene and/or video. Similarly, negative feedback may be provided based on absence of user entry and/or selection of one or more particular scenes displayed in portion 207.

By way of non-limiting example, the learning component 114 may be configured to obtain information related to user interaction with the user interface. The information related to user interaction may facilitate determinations of the accuracy of the associations of the semantic labels with the determined scenes and/or content of the scenes (e.g., by the labeling component 110). Based on these determinations, the associations made by the labeling component 110 may be adjusted or "tuned" such that over time semantic labels that may be associated with content may more accurately represent the content.

In FIG. 1, the server 102, user device(s) 104, and/or external resources 105 may be operatively linked via one or more electronic communication links. For example, such electronic communication links may be established, at least in part, via a network 114 such as the Internet and/or other networks. It will be appreciated that this is not intended to be limiting, and that the scope of this disclosure includes implementations in which server 102, user device(s) 104, and/or external resources 105 may be operatively linked via some other communication media.

The external resources 105 may include sources of information, hosts and/or providers of information outside of system 100, external entities participating with system 100, and/or other resources. In some implementations, some or all of the functionality attributed herein to external resources 105 may be provided by resources included in system 100 (e.g., in one or more servers 118 and/or 120).

The server 102 may include electronic storage 116, one or more processors 104, and/or other components. The server 102 may include communication lines or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102.

Electronic storage 116 may comprise electronic storage media that electronically stores information. The electronic storage media of electronic storage 116 may include one or both of system storage that is provided integrally (i.e., substantially non-removable) with server 102 and/or removable storage that is removably connectable to server 102 via, for example, a port or a drive. A port may include a USB port, a firewire port, and/or other port. A drive may include a disk drive and/or other drive. Electronic storage 116 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 116 may include one or more virtual storage resources (e.g., cloud storage, a virtual private network, and/or other virtual storage resources). Electronic storage 116 may store software algorithms, information determined by processor 104, information received from server 102, and/or other information that enables server 102 to function as described herein.

Processor(s) 104 is configured to provide information processing capabilities in server 102. As such, processor 104 may include one or more of a digital processor, an analog processor, a digital circuit designed to process information, an analog circuit designed to process information, a state machine, and/or other mechanisms for electronically processing information. Although processor 104 is shown in FIG. 1 as a single entity, this is for illustrative purposes only. In some implementations, processor 104 may include one or more components. These components may be physically located within the same device, or processor 104 may represent processing functionality of a plurality of devices operating in coordination. The processor 104 may be configured to execute components 108, 110, 112, and/or 114. Processor 104 may be configured to execute components 108, 110, 112, and/or 114 by software; hardware; firmware; some combination of software, hardware, and/or firmware; and/or other mechanisms for configuring processing capabilities on processor 104. In some implementations, user devices 104 may include a same or similar processor as processor 104, and/or other considerations.

It should be appreciated that, although components 108, 110, 112, and/or 114 are illustrated in FIG. 1 as being co-located within a single component, in implementations in which processor 104 includes multiple components, one or more of components 108, 110, 112, and/or 114 may be located remotely from the other components. The description of the functionality provided by the different components 108, 110, 112, and/or 114 described above is for illustrative purposes and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, 114, and/or other components. As another example, processor 104 may be configured to execute one or more additional components that may perform some or all of the functionality attributed below to one of components 108, 110, 112, and/or 114.

Figure 4:
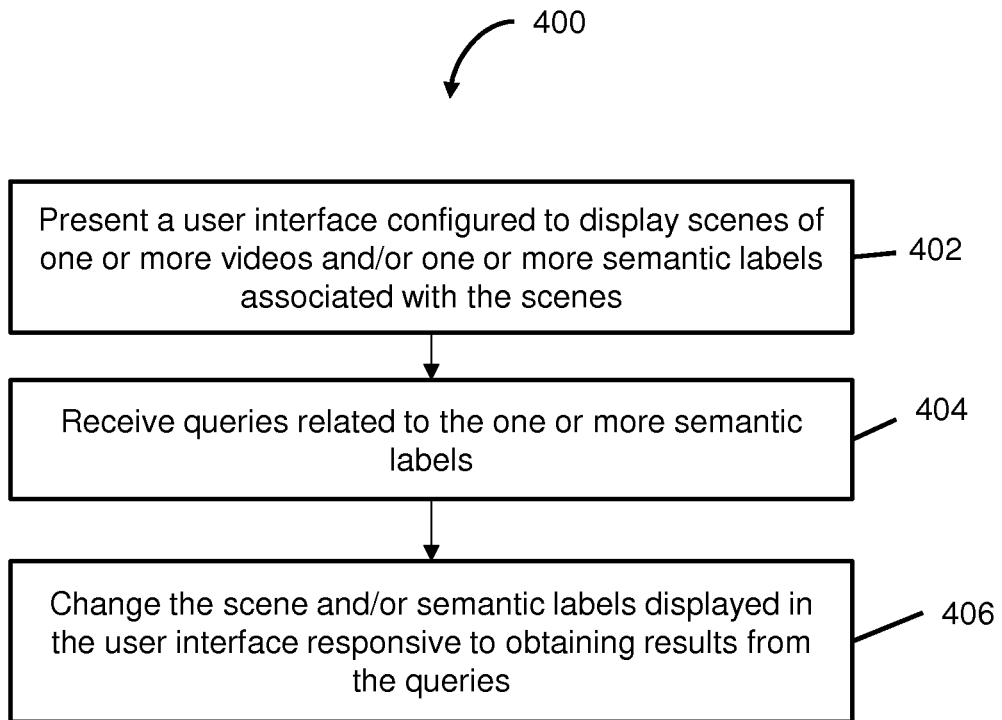
FIG. 4 illustrates a method of browsing, searching, and/or viewing video with associated semantic labels via a user interface, in accordance with one or more implementations.

FIG. 4 illustrates a method 400 of browsing, searching, and/or viewing video content via a user interface based on associated semantic labels. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 3 and described below is not intended to be limiting.

In some embodiments, method 400 may be implemented in one or more processing devices (e.g., a digital processor, an analog processor, a digital circuit designed to process information, an analog circuit designed to process information, a state machine, a functionally limited processing device, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

Referring now to method 400 in FIG. 2, at an operation 402, presentation of a user interface may be effectuated, the user interface being configured to display scenes of one or more videos and/or one or more semantic labels associated with the scenes. The user interface may be configured to display a first scene associated with a first video and/or a first semantic label associated with the first scene. In some implementations, operation 402 may be performed by a user interface component the same as or similar to user interface component 112 (shown in FIG. 1 and described herein).

At an operation 404, queries related to the one or more semantic labels may be received. The queries may correspond to entry and/or selection of information associated with the one or more semantic labels by a user via the user interface. The received queries may include a first query related to a second semantic label. In some implementations, operation 404 may be performed by a user interface component the same as or similar to the user interface component 112 (shown in FIG. 1 and described herein).

At an operation 406, a change in the scenes and/or semantic labels displayed in the user interface may be effectuated based on results obtained from the queries. The change in the scenes and/or semantic labels may correspond to the results obtained from the queries. For example, responsive to obtaining first results from the first query, the user interface may be configured to display a second scene of the first video. The second scene may correspond to the second semantic label. In some implementations, operation 406 may be performed by a user interface component the same as or similar to the user interface component 112 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for browsing, searching, and/or viewing video content via a user interface, the system comprising:
   a computer system that comprises one or more processors programmed with computer program instructions that, when executed, cause the computer system to:
   present a first video on a user interface, the user interface being configured to present scenes of the first video and a plurality of semantic labels associated with the scenes of the first video;
   obtain, during presentation of a first scene of the first video, a selection of a semantic label from the plurality of semantic labels;
   cause, during the presentation of the first scene of the first video, a jump from the first scene to a second scene of the first video based on the selection of the semantic label, the second scene being associated with the selected semantic label, and the jump from the first scene to the second scene causing the second scene to be presented on the user interface;
   present, during presentation of the second scene of the first video, a list of one or more other scenes of the first video that are similar to the second scene of the first video on the user interface;
   obtain, during the presentation of the second scene of the first video, a selection of a third scene from the list of one or more other scenes of the first video;
   in response to the selection of the third scene of the first video, cause, during the presentation of the second scene of the first video, a jump from the second scene of the first video to the selected third scene of the first video, the jump from the second scene to the selected third scene causing the selected third scene to be presented on the user interface; and
   dynamically change the presentation of the plurality of semantic labels based on the jump from the first scene to the second scene and the jump from the second scene to the third scene such that the presentation of the plurality of semantic labels on the user interface is associated with a currently presented scene.

2. The system of claim 1, wherein the one or more other scenes are ranked by similarity to the second scene and are presented based on the ranking.

3. The system of claim 2, wherein the ranking is based on content similarity or similarity between semantic labels associated with the scenes of the first video.

4. The system of claim 1, wherein the computer system is caused to:
   obtain, during the presentation of the third scene of the first video, a query;
   in response to the query, determine a corresponding semantic label associated with a fourth scene of the first video; and
   cause, during the presentation of the third scene of the first video, a jump from the third scene to the fourth scene based on the corresponding semantic label, the jump from the third scene to the fourth scene causing the fourth scene to be presented on the user interface.

5. The system of claim 1, wherein the computer system is caused to:
   determine confidence parameters for associations of the plurality of semantic labels to the scenes, the confidence parameters reflecting relative matches between the plurality of semantic labels and the scenes and/or content of the scenes.

6. The system of claim 5, wherein the computer system is caused to:
   responsive to the first scene of the first video being presented on the user interface, present a first confidence parameter corresponding to an association of the first scene with a first semantic label associated with the first scene.

7. The system of claim 6, wherein the computer system is caused to:
   present a graphical rendering of the first confidence parameter.

8. The system of claim 1, wherein the computer system is caused to:
   obtain information related to user interaction with the user interface, the information related to user interaction including the obtained selection of the third scene from the list of one or more other scenes of the first video;
   determine an association between the selected third scene and the second scene as a positive feedback;
   determine an absence of a selection of a scene from the one or more other scenes as a negative feedback; and
   update the list of one or more other scenes that are similar to the second scene based on the positive and negative feedbacks.

9. A method for browsing, searching, and/or viewing video content via a user interface, the method comprising:
presenting a first video on a user interface, the user interface being configured to present scenes of the first video and a plurality of semantic labels associated with the scenes of the first video;
obtaining, during presentation of a first scene of the first video, a selection of a semantic label from the plurality of semantic labels;
causing, during the presentation of the first scene of the first video, a jump from the first scene to a second scene of the first video based on the selection of the semantic label, the second scene being associated with the selected semantic label, and the jump from the first scene to the second scene causing the second scene to be presented on the user interface;
presenting, during presentation of the second scene of the first video, a list of one or more other scenes of the first video that are similar to the second scene of the first video on the user interface;
obtaining, during the presentation of the second scene of the first video, a selection of a third scene from the list of one or more other scenes of the first video;
in response to the selection of the third scene of the first video, causing, during the presentation of the second scene of the first video, a jump from the second scene of the first video to the selected third scene of the first video, the jump from the second scene to the selected third scene causing the selected third scene to be presented on the user interface; and
dynamically changing the presentation of the plurality of semantic labels based on the jump from the first scene to the second scene and the jump from the second scene to the third scene such that the presentation of the plurality of semantic labels on the user interface is associated with a currently presented scene.

10. The method of claim 9, wherein the one or more other scenes are ranked by similarity to the second scene and are presented based on the ranking.

11. The method of claim 10, wherein the ranking is based on content similarity or similarity between semantic labels associated with the scenes of the first video.

12. The method of claim 9, further comprising:
obtaining, during the presentation of the second scene of the first video, a query;
in response to the query, determining a corresponding semantic label associated with a fourth scene of the first video; and
causing, during the presentation of the third scene of the first video, a jump from the third scene to the fourth scene based on the corresponding semantic label, the jump from the third scene to the fourth scene causing the fourth scene to be presented on the user interface.

13. The method of claim 9, further comprising:
determining confidence parameters for associations of semantic labels to the scenes, the confidence parameters reflecting relative matches between the semantic labels and the scenes and/or content of the scenes.

14. The method of claim 13, further comprising:
responsive to the first scene of the first video being presented on the user interface, presenting a first confidence parameter corresponding to an association of the first scene with a first semantic label associated with the first scene.

15. The method of claim 9, further comprising:
obtaining information related to user interaction with the user interface, the information related to user interaction including the obtained selection of the third scene from the list of one or more other scenes of the first video;
determining an association between the selected third scene and the second scene as a positive feedback;
determining an absence of a selection of a scene from the one or more other scenes as a negative feedback; and
updating the list of one or more other scenes that are similar to the second scene based on the positive and negative feedbacks.

16. One or more non-transitory, computer-readable media storing instructions that, when executed by one or more processors, effectuate operations comprising:
presenting a first video on a user interface, the user interface being configured to present scenes of the first video and a plurality of semantic labels associated with the scenes of the first video;
obtaining, during presentation of a first scene of the first video, a selection of a semantic label from the plurality of semantic labels;
causing, during the presentation of the first scene of the first video, a jump from the first scene to a second scene of the first video based on the selection of the semantic label, the second scene being associated with the selected semantic label, and the jump from the first scene to the second scene causing the second scene to be presented on the user interface;
presenting, during presentation of the second scene of the first video, a list of one or more other scenes of the first video that is similar to the second scene of the first video on the user interface;
obtaining, during the presentation of the second scene of the first video, a selection of a third scene from the list of one or more other scenes of the first video;
in response to the selection of the third scene the first video, causing, during the presentation of the second scene of the first video, a jump from the second scene of the first video to the selected third scene of the first video, the jump from the second scene to the selected third scene causing the selected third scene to be presented on the user interface; and
dynamically changing the presentation of the plurality of semantic labels based on the jump from the first scene to the second scene and the jump from the second scene to the third scene such that the presentation of the plurality of semantic labels on the user interface is associated with a currently presented scene.

17. The non-transitory, computer-readable media of claim 16, further comprising:
obtaining, during the presentation of the second scene of the first video, a query;
in response to the query, determining a corresponding semantic label associated with a fourth scene of the first video; and
causing, during the presentation of the third scene of the first video, a jump from the third scene to the fourth scene based on the corresponding semantic label, the jump from the third scene to the fourth scene causing the fourth scene to be presented on the user interface.

18. The non-transitory, computer-readable media of claim 16, further comprising:
obtaining information related to user interaction with the user interface, the information related to user interaction including the obtained selection of the third scene from the list of one or more other scenes of the first video;

determining an association between the selected third scene and the second scene as a positive feedback;
determining an absence of a selection of a scene from the one or more other scenes as a negative feedback; and
updating the list of one or more other scenes that is similar to the second scene based on the positive and negative feedbacks.

* * * * *